(12) United States Patent
Xiao (10) Patent No.: US 11,584,266 B2
(45) Date of Patent: Feb. 21, 2023

(54) SEAT BELT FIXING DEVICE AND SEAT COMPRISING THE SAME

(71) Applicant: WONDERLAND SWITZERLAND AG, Steinhausen (CH)

(72) Inventor: Xiaohong Xiao, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 58 days.

(21) Appl. No.: 17/329,195

(22) Filed: May 25, 2021

(65) Prior Publication Data

US 2021/0370808 A1 Dec. 2, 2021

(30) Foreign Application Priority Data

May 26, 2020 (CN) .......................... 202010459845.2

(51) Int. Cl.
*B60N 2/28* (2006.01)
(52) U.S. Cl.
CPC ......... *B60N 2/2806* (2013.01); *B60N 2/2821* (2013.01); *B60N 2/2842* (2013.01)
(58) Field of Classification Search
CPC ............................ B60N 2/2806; B60N 2/2842
See application file for complete search history.

(56) References Cited

U.S. PATENT DOCUMENTS

| 8,322,788 | B2* | 12/2012 | Williams | B60N 2/2821 |
| | | | | 297/256.16 |
| 8,573,695 | B2* | 11/2013 | Van Geer | B60N 2/2806 |
| | | | | 297/256.16 |
| 8,973,991 | B2* | 3/2015 | Wuerstl | B60N 2/2821 |
| | | | | 297/253 |
| 9,365,135 | B2 | 6/2016 | Carpenter | |
| 10,035,436 | B2* | 7/2018 | Zhou | B60N 2/2806 |
| 10,336,219 | B2* | 7/2019 | Mason | B60N 2/2821 |
| 10,406,947 | B2 | 9/2019 | Anderson et al. | |
| 10,696,192 | B2* | 6/2020 | Harmes, V | B60N 2/2872 |
| 10,737,593 | B1* | 8/2020 | Shellenberger | B60N 2/2806 |
| 2011/0140491 | A1* | 6/2011 | Williams | B60N 2/2821 |
| | | | | 297/256.16 |
| 2015/0183341 | A1* | 7/2015 | Carpenter | B60N 2/2821 |
| | | | | 297/256.16 |
| 2021/0370808 | A1* | 12/2021 | Xiao | B60N 2/2845 |
| 2021/0370809 | A1* | 12/2021 | Xiao | B60N 2/2845 |

FOREIGN PATENT DOCUMENTS

| CN | 204398919 U | 6/2015 |
| CN | 305364393 S | 9/2019 |

\* cited by examiner

*Primary Examiner* — Philip F Gabler (57) ABSTRACT

A seat belt fixing device and a seat including the same are introduced. The seat belt fixing device includes a seat belt clamp, top rod body, fixedly engaging element, locking element, and operating element coupled to the locking element. The seat belt clamp includes a first clamping element rotatably mounted on the seat and a second clamping element formed on the seat. The second clamping element is rotatable to a locked position to operate in conjunction with the first clamping element in clamping a seat belt. The top rod body and the second clamping element are connected and rotate concentrically. The locking element and fixedly engaging element are mounted on the top rod body (or second clamping element) and the seat, respectively. At the locked position, the locking element fittingly, engagingly connects to the fixedly engaging element to lock the top rod body and second clamping element.

19 Claims, 10 Drawing Sheets

SEAT BELT FIXING DEVICE AND SEAT COMPRISING THE SAME

CROSS-REFERENCE TO RELATED APPLICATION

This non-provisional application claims priority under 35 U.S.C. § 119(a) on Patent Application No(s). 202010459845.2 filed in China on May 26, 2020, the entire contents of which are hereby incorporated by reference.

BACKGROUND OF THE INVENTION

1. Field of the Invention

The present disclosure relates to vehicular seats, and in particular to a seat belt fixing device and a seat comprising the same.

2. Description of the Related Art

A conventional child seat mounted on a vehicular seat is dedicated to a child passenger and equipped with a binder apparatus for fastening the child passenger to the child seat to ensure the child passenger's safety. The child seat minimizes injuries caused to the child passenger in case of an urgent brake or collision and thus is readily accepted by consumers and popularized worldwide.

The child seat is fixed to the vehicular seat with a special seat connector or seat belt. To this end, the vehicular seat is equipped with a special seat belt fixer for clamping a seat belt. Conventionally, the seat belt fixer is provided in the form of one or more spring clips. Users stretch the spring clips, insert the seat belt, and release the spring clips, allowing the seat belt to be held by the spring clips. However, the spring clips pose a risk to user safety.

A vehicular seat for use by infant comprises a base and a carrycot. The base is directly fixed to the vehicular seat. The carrycot is mounted on the base. However, the carrycot and base are separable, and thus only the bottom surface of the base is in contact with the vehicular seat, thereby resulting in insufficient stability. Prior art discloses lengthening the end portion of the base and providing a support rail (for example, a support leg 11 of CN204398919U and a support back rest of CN305364393S) on the end portion of the base, at the cost of fixing the seat belt in place with a spring clip, thereby rendering the products structurally complicated, bulky, difficult to deliver, and expensive.

Therefore, it is imperative to provide a seat belt fixing device and a seat comprising the same.

BRIEF SUMMARY OF THE INVENTION

An objective of the present disclosure is to provide a seat belt fixing device and a seat comprising the same, which are structurally simple, safe, stable, and easy to use.

To achieve at least the above objective, the present disclosure provides a seat belt fixing device. The seat belt fixing device comprises a seat belt clamp mounted on a seat, a top rod body, a locking component and an operating element. The seat belt clamp comprises a first clamping element formed on the seat and a second clamping element rotatably configured on the seat. The second clamping element is rotatable to a locked position to operate in conjunction with the first clamping element in clamping the seat belt. The top rod body and the second clamping element are connected and rotate concentrically. The locking component comprises a locking element and a fixedly engaging element. One of the locking element and the fixedly engaging element is configured on the top rod body or second clamping element. The other one of the locking element and fixedly engaging element is configured on the seat. At the locked position, the locking element fittingly, engagingly connects to the fixedly engaging element on the seat to lock the top rod body and second clamping element. The operating element connects to the locking element. The operating element is operated to drive the movement of the locking element and thereby controllably cause the locking element to fittingly engage with the fixedly engaging element.

Compared with the prior art, the present disclosure provides a seat belt fixing device which has a seat belt clamp for securing a seat belt and has a top rod body for functioning as a seat top rod. The seat belt clamp and the top rod body rotate concentrically. The top rod body serves as a wrench for use by the seat belt clamp, so as to integrate the top rod body with the seat belt clamp, simply the structure of the seat belt clamp, and allow users to operate the seat belt clamp single-handedly. In addition, the top rod body rotates the seat belt fixing device to the locked position to thereby lock the second clamping element, thereby allowing the seat belt clamp to fix the seat belt in place firmly.

Preferably, at the locked position, a terminal end of the top rod body extends to an outer edge of the seat to form a blocking fixing portion protruding from the seat. The top rod body functions as a seat safety rail for preventing the child seat from falling off the base or preventing child passengers from falling off the child seat, serves as a cushion between the vehicular seat and the seat, and allows the seat to be firmly mounted on the vehicular seat.

Preferably, an acute angle is formed between a straight line joining a terminal end of the blocking fixing portion and a rotation center of the top rod body and a bottom surface of a base of the seat. When the seat is mounted on the vehicular seat, a terminal end of blocking fixing portion, the rotation center of top rod body, and the vehicular seat together form a tripod-shaped structure to stabilize the seat.

Preferably, a terminal end of the top rod body upwardly bends and extends, such that the contact area between the blocking fixing portion and the back of the vehicular seat increases, thereby augmenting mechanical strength of the top rod body.

The top rod body comprises a rotating portion rotatably mounted on the seat, two rotation arms coupled to the rotating portion and flanking the seat, and a blocking transverse arm coupled to terminal ends of the two rotation arms, wherein terminal ends of the two rotation arms and the blocking transverse arm form the blocking fixing portion. Therefore, the blocking fixing portion is structurally stable.

The top rod body further comprises a mounting rod coupled to the rotation arms or blocking transverse arm, and the locking element is configured on the mounting rod.

The terminal ends of the rotation arms bend by tilting upward, and two ends of the mounting rod are coupled to the bends of the two rotation arms, respectively, thereby further augmenting the rigidity of the blocking fixing portion.

The mounting rod is mounted between the two rotation arms and parallel to the blocking transverse arm. The locking element or fixedly engaging element is mounted at a middle or a lateral portion of the mounting rod.

The mounting rod is mounted between the two rotation arms and parallel to the blocking transverse arm. One end of the second clamping element is configured at a middle of the mounting rod.

The seat comprises an infant seat and a base mounted on the infant seat. A seat belt fixing device is rotatably mounted on the base.

Preferably, the locking element comprises a fittingly engaging element and a first resilient element. The fittingly engaging element is movably mounted on the top rod body, second clamping element or seat and snap-engaged with the fixedly engaging element. The first resilient element provides to the fittingly engaging element a resilience force for fittingly engaging with the fixedly engaging element, such that at the locked position the fittingly engaging element is fittingly, engagingly coupled to the fixedly engaging element. The operating element is operated to controllably cause the fittingly engaging element to separate from the fixedly engaging element. Therefore, the top rod body and second clamping element synchronously rotate to the locked position and thus are automatically locked.

Preferably, the seat belt clamp further comprises a second resilient element. The second resilient element provides to the second clamping element a resilience force for rotating away from the locked position. Therefore, after the operating element has released the locking element, the second clamping element rotates away from the locked position under the action of the second resilient element; hence, the second clamping element is open to thereby automatically unfasten the seat belt, allowing users to position or remove the seat belt easily.

Preferably, the second clamping element comprises a clamping portion operating in conjunction with the first clamping element and a reinforcing portion coupled to the clamping portion, wherein the reinforcing portion has a front end coupled to a rotating shaft of the second clamping element and a terminal end inserted into the top rod body.

The fittingly engaging element is rotatably coupled to the top rod body, second clamping element or seat.

Preferably, the fixedly engaging element is a fixedly engaging groove, and the locking element comprises a fittingly engaging hook fittingly, engagingly coupled to the fixedly engaging groove. Alternatively, the fixedly engaging element is a hole, bump, or fittingly engaging edge, and the locking element has a corresponding bump, hole, or fittingly engaging platform.

The fixedly engaging groove has therein a roller rotatably mounted in place and adapted to operate in conjunction with the fittingly engaging hook or an arcuate fixing edge or fixing cylinder fixedly mounted in place and adapted to operate in conjunction with the fittingly engaging hook.

A receiving chamber is not only disposed on the second clamping element, the top rod body or the seat which the fixedly engaging element is mounted on but also corresponds in position to the locking element, wherein an edge of the receiving chamber extends outward to form a resilient arm, wherein a recess is formed between an end portion of the resilient arm and another edge of the receiving chamber and adapted to receive the fittingly engaging hook, wherein the fixedly engaging groove is formed below the end portion of the resilient arm.

Preferably, the operating element comprises a press button capable of resilient position restoration. Alternatively, the operating element is a push element or a pull element.

Preferably, the second clamping element has a front end rotatably configured on the seat and a terminal end coupled to the top rod body.

The present disclosure further provides a seat comprising the seat belt fixing device. The seat has a fixedly engaging element fittingly, engagingly coupled to the locking element.

Preferably, the seat comprises a seat body and a base for mounting the seat body in place, wherein the seat belt fixing device is mounted on the base, and the seat body is a carrycot.

DETAILED DESCRIPTION OF THE INVENTION

To facilitate understanding of the object, characteristics and effects of this present disclosure, embodiments together with the attached drawings for the detailed description of the present disclosure are provided.

Referring to FIG. 1 through FIG. 8, the present disclosure provides a seat 100. The seat 100 holds thereon a seat belt fixing device 20 and a fixedly engaging element 11 in place. The seat belt fixing device 20 comprises a seat belt clamp 30, top rod body 21, locking element 22, and operating element 23 coupled to locking element 22. The seat belt clamp 30 comprises a first clamping element 31 formed on seat 100 and a second clamping element 32 rotatably configured on seat 100. The second clamping element 32 is rotatable to a locked position to clamp a seat belt (not shown) and the top rod body 21 while operating in conjunction with the first clamping element 31. The top rod body 21 and second clamping element 32 are connected and rotate concentrically. The locking element 22 is configured at a terminal end of the second clamping element 32. At the locked position, the locking element 22 is fittingly, engagingly coupled to the fixedly engaging element 11 to lock the top rod body 21 and second clamping element 32. The operating element 23 is operated to drive movement of the locking element 22 in order to control the fittingly engagement between the locking element 22 and the fixedly engaging element 11.

The fixedly engaging element 11 and locking element 22 together form a locking component. The fixedly engaging element 11 is configured (formed) on the seat 100. The locking element 22 is configured on the second clamping element 32. However, the present disclosure is not restricted to the embodiment. In a variant embodiment, the locking element 22 is also formed on the seat 100, and the fixedly engaging element 11 is configured or formed on the second clamping element 32, allowing the operating element 23 to be positioned on the seat 100.

Figure 8:
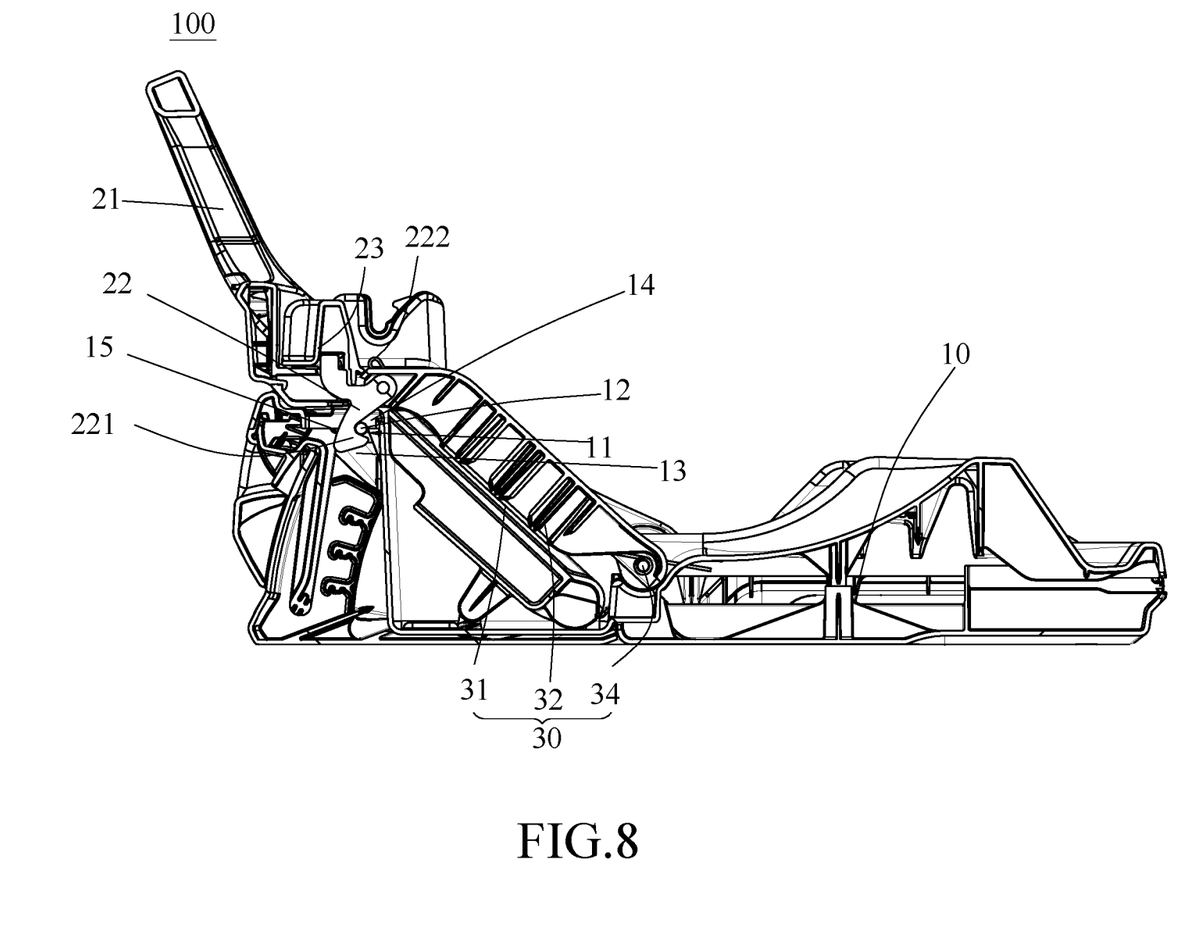
FIG. 8 is a cross-sectional view taken along line B-B of FIG. 7.

Referring to FIG. 8, in this embodiment, the top rod body 21 is rotatably configured on the seat 100 and rotates concentrically together with the second clamping element 32. The top rod body 21 has one end rotatably coupled to the seat 100 and the other end directly coupled to the second clamping element 32. In a variant embodiment, the top rod body 21 can be coupled to the second clamping element 32 through a third element or directly configured on the rotating shaft 34 of the second clamping element 32, provided that the top rod body 21 rotates with the second clamping element 32.

Figure 9:
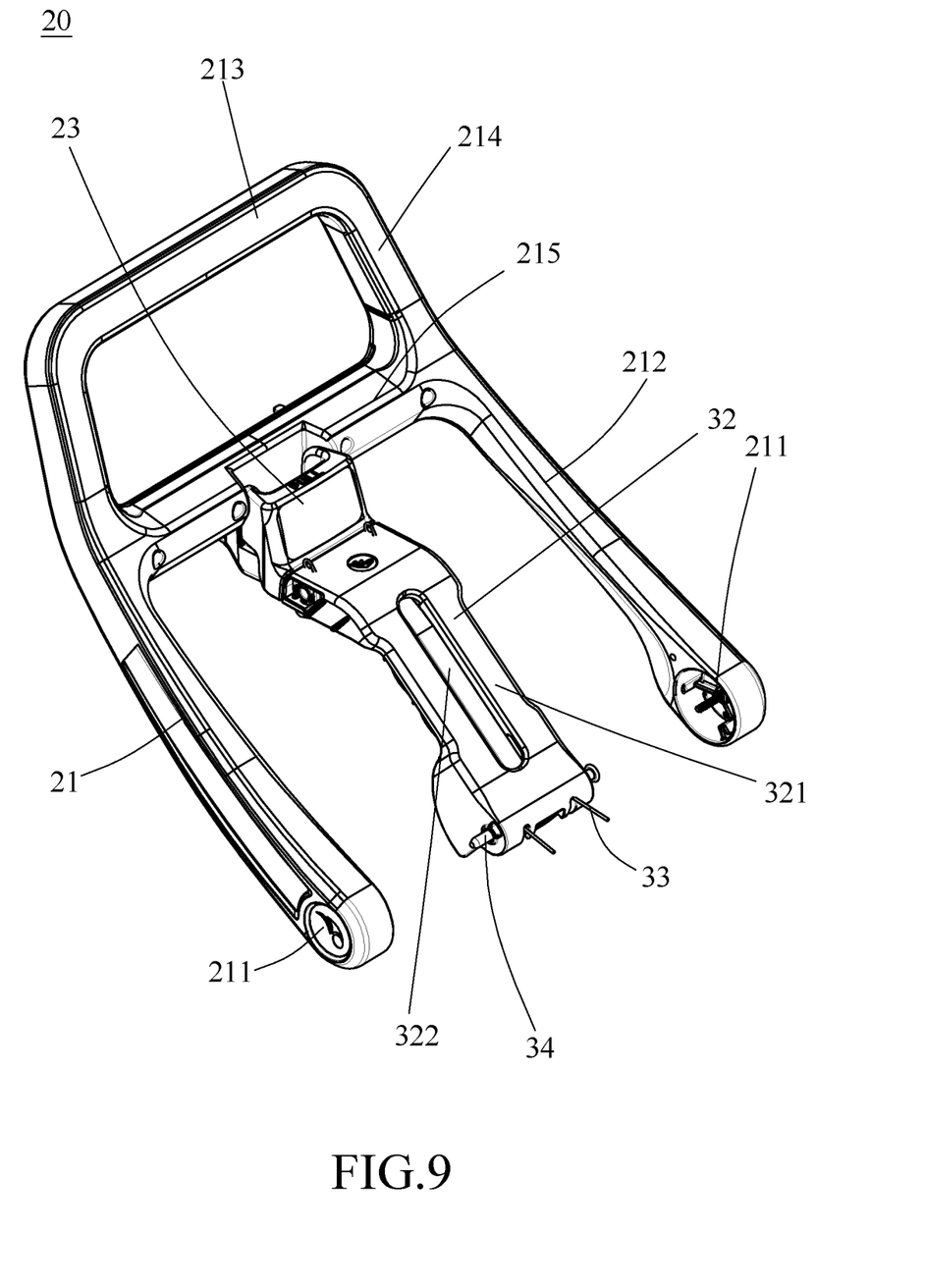
FIG. 9 is a schematic view of the seat belt fixing device according to the present disclosure.
Figure 10:
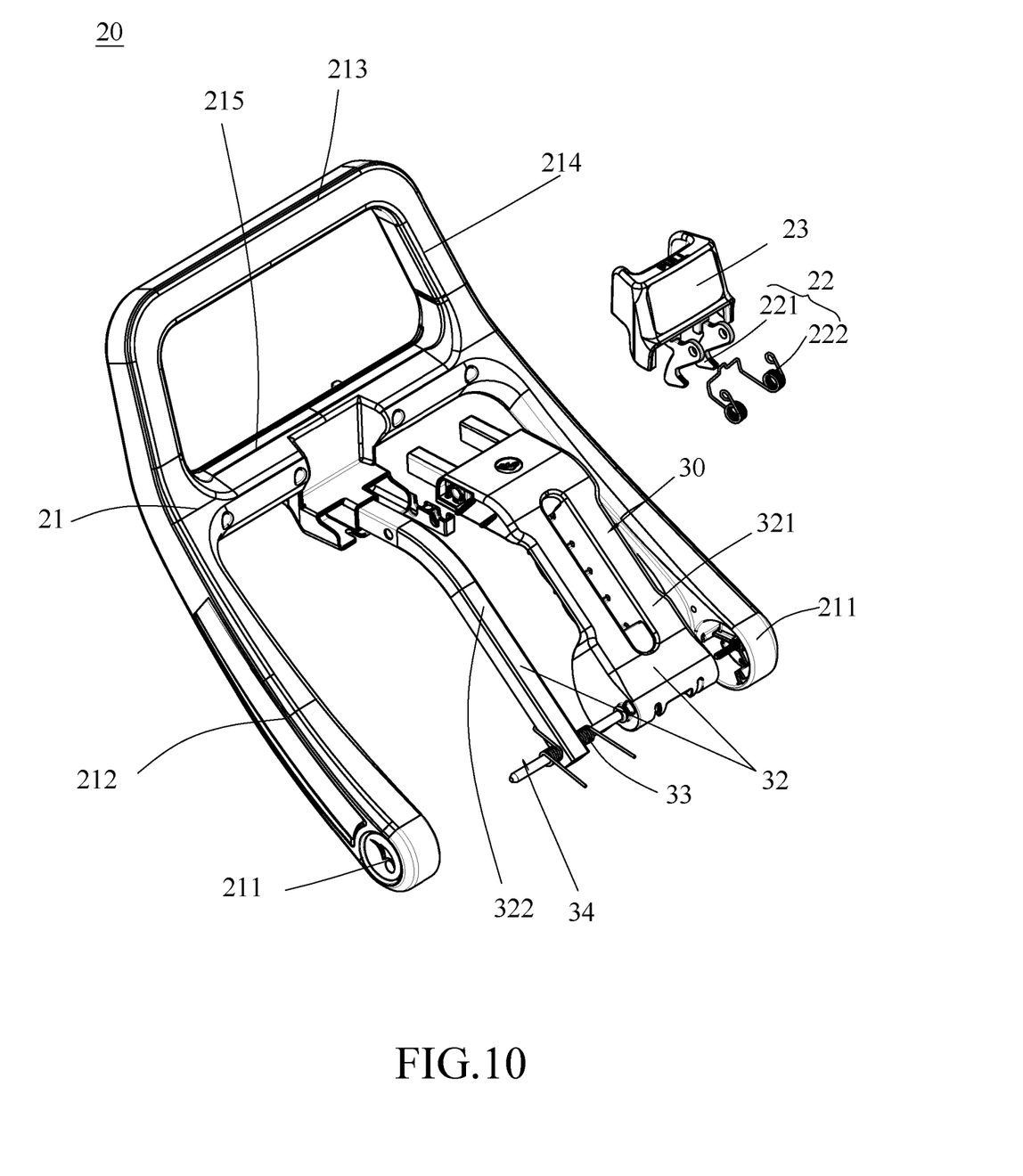
FIG. 10 is an exploded view based on FIG. 9.

Referring to FIG. 8 through FIG. 10, the seat belt clamp 30 further comprises a second resilient element 33 coupled to the second clamping element 32. The second resilient element 33 provides to the second clamping element 32 a resilience force for moving away from the locked position. After the operating element has released the locking element, the second clamping element 32 rotates under the action of the second resilient element 33 to move away from the locked position, automatically unfastens the seat belt, and allows users to position or remove the seat belt.

Referring to FIG. 10, the second clamping element 32 comprises a clamping portion 321 operating in conjunction with the first clamping element 31 and a reinforcing portion 322 coupled to the clamping portion 321. The reinforcing portion 322 has a front end coupled to the rotating shaft 34 of the second clamping element 32 and a terminal end inserted into the top rod body 21.

In this embodiment, the seat 100 comprises a carrycot 16 and a base 10. The fixedly engaging element 11 is disposed on the base 10. The second clamping element 32 and top rod body 21 are rotatably coupled to the base 10. The first clamping element 31 is formed on the base 10. In this embodiment, the carrycot 16 is removably installed on the base 10. Alternatively, the seat 100 is any other safety seat rather than restricted to this embodiment, for example, the carrycot 16 is a seat body of a safety seat for use by infants or juveniles.

Figure 1:
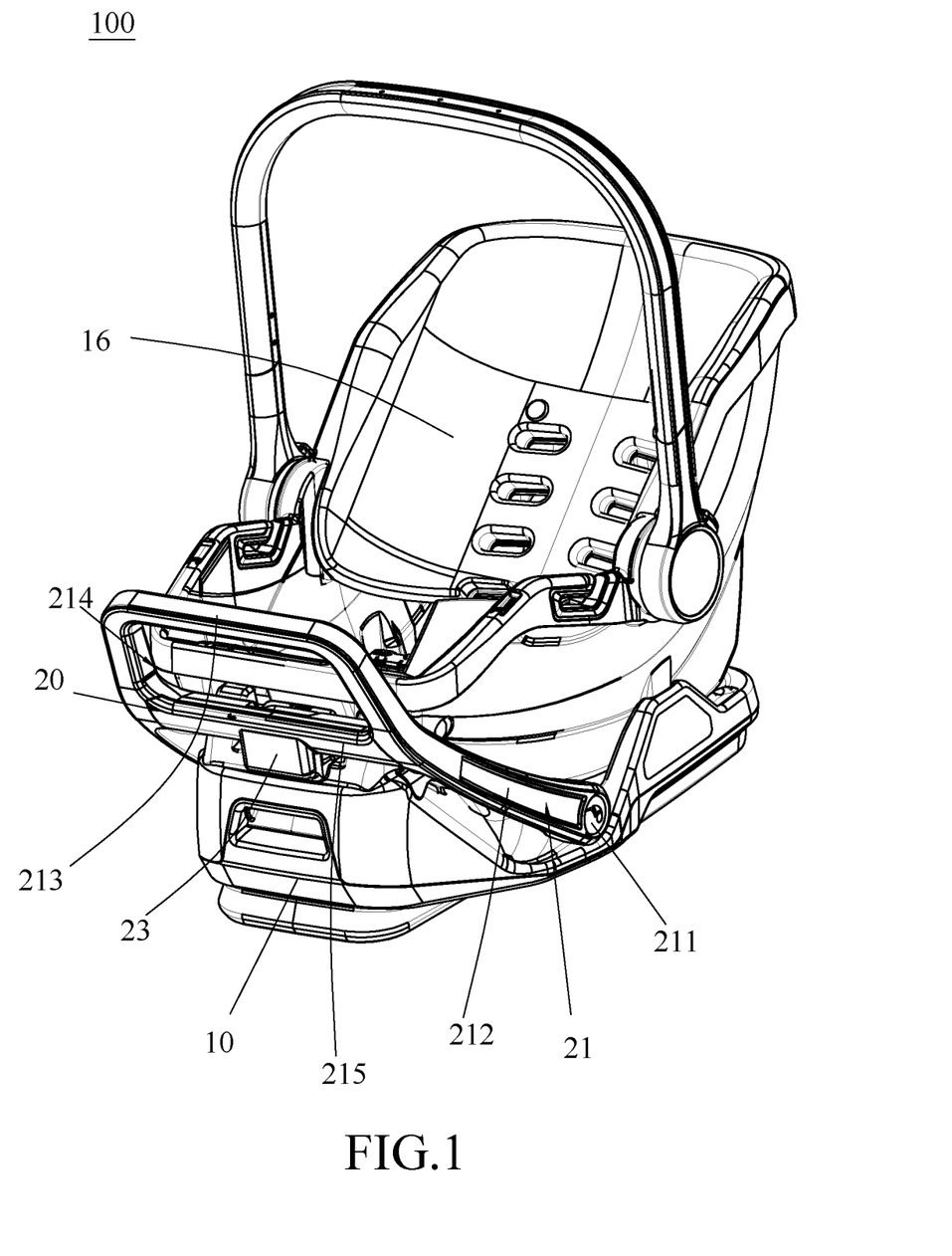
FIG. 1 is a schematic view of a seat, with a seat belt fixing device located at a locked position and holding a carrycot in place, according to the present disclosure.
Figure 2:
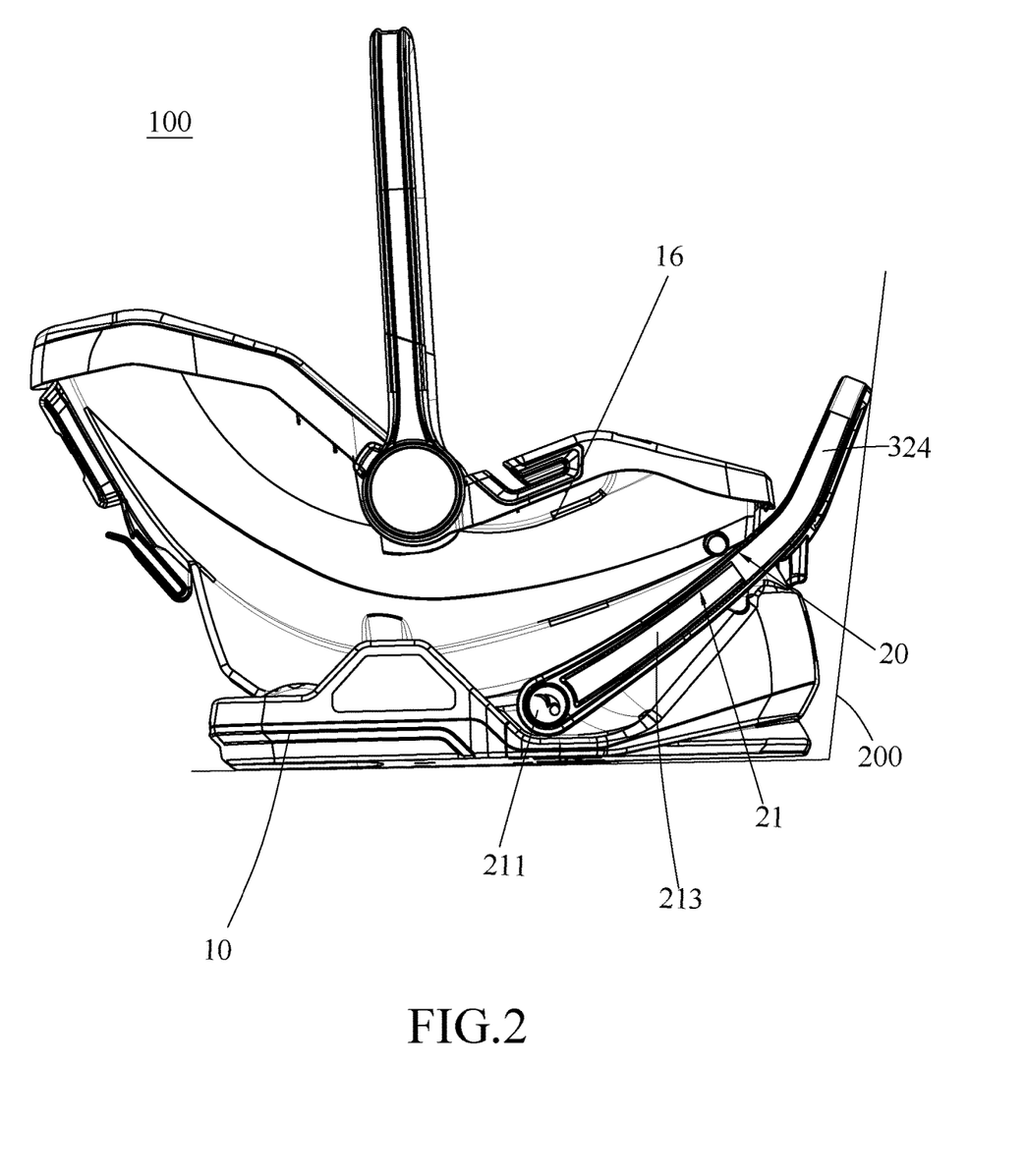
FIG. 2 is a lateral view based on FIG. 1.
Figure 3:
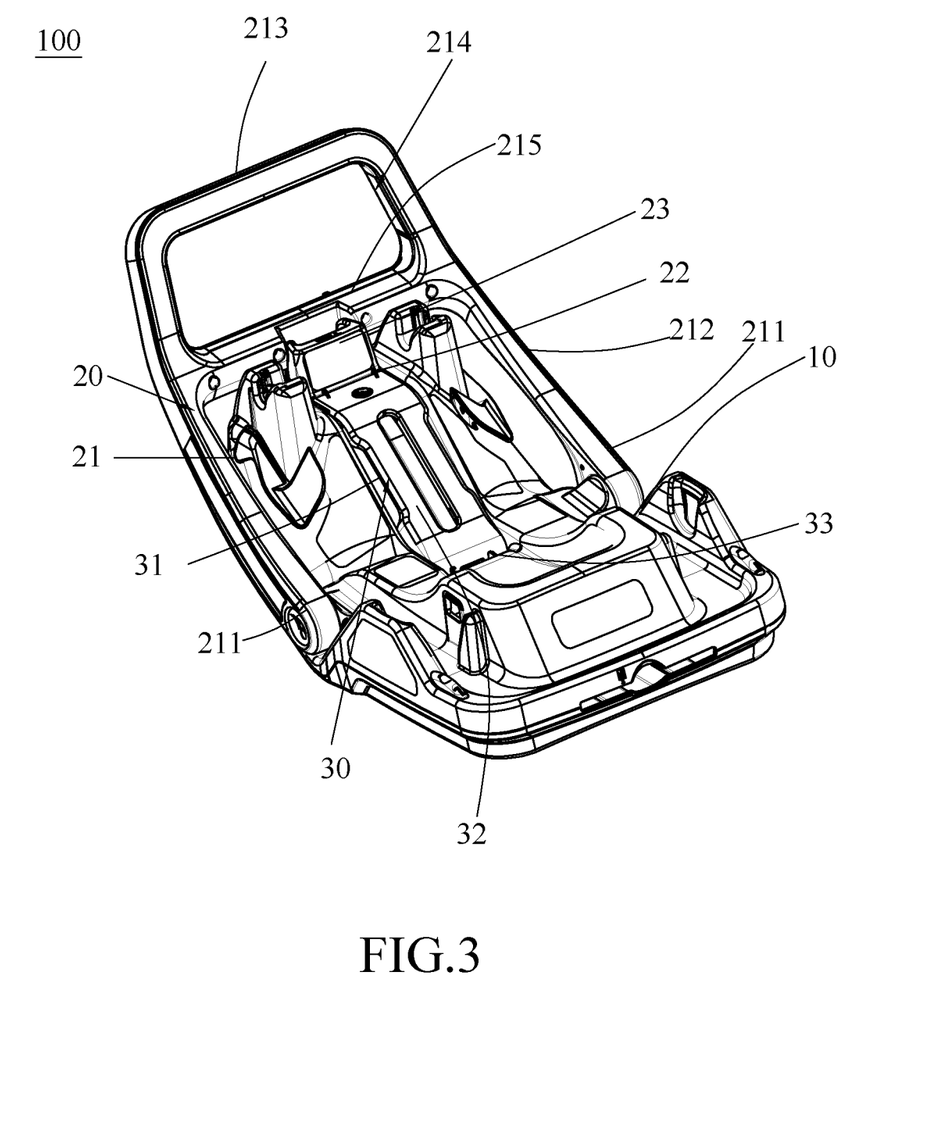
FIG. 3 is a schematic view of the seat, with the seat belt fixing device located at the locked position but not holding the carrycot, according to the present disclosure.

Referring to FIG. 2, FIG. 3 and FIG. 8, in this embodiment, the top rod body 21 is configured on the base 10 and abuts against a stabilizing rail of a vehicular seat back rest 200. When the top rod body 21 is at the locked position, its terminal end extends to the outer edge of the seat 10 to form a blocking fixing portion 214 capable of protruding from the base 10 of the seat 100. The blocking fixing portion 214 abuts against the vehicular seat back rest 200. Alternatively, the top rod body 21 is configured on the base 10 and abuts against a support post of the vehicular seat back rest 200. At the locked position, a terminal end of the top rod body 21 extends to below the seat 10 to form a support post capable of protruding from below the base of the seat 100 and supportedly disposed between the seat 100 and the floor in the vehicle. The abovementioned constitutes a preferred embodiment of the present disclosure.

Referring to FIG. 2, an acute angle is formed between a straight line joining a terminal end of the blocking fixing portion 214 and the rotation center of the top rod body 21 and the bottom surface of the base 10 of the seat 100. In this embodiment, the rotation center of the top rod body 21 may be located at the middle of the base 10. Alternatively, the rotation center of the top rod body 21 may be located at the middle and the front end of the base 10 to reduce the included angle between the bottom surface of the base 10 and the top rod body 21, and the included angle between the top rod body 21 and the base 10 is preferably less than or equal to 45°. When the seat 100 is installed on the vehicular seat, the terminal end of blocking fixing portion 214, the rotation center of top rod body 21, and the vehicular seat together form a tripod-shaped structure to stabilize the seat 100. Referring to FIG. 2, the terminal end of top rod body 21, i.e., the terminal end of blocking fixing portion 214, is higher than the rear edge of the base of the seat 100 to further enhance the safety of the seat 100.

Referring to FIG. 2, the terminal end of top rod body 21 upwardly bends and extends, i.e., blocking fixing portion 214 to bend upward relative to the front half of top rod body 21; hence, the contact area between the blocking fixing portion 214 and the back of the vehicular seat increases, thereby augmenting mechanical strength of the top rod body 21.

Figure 4:
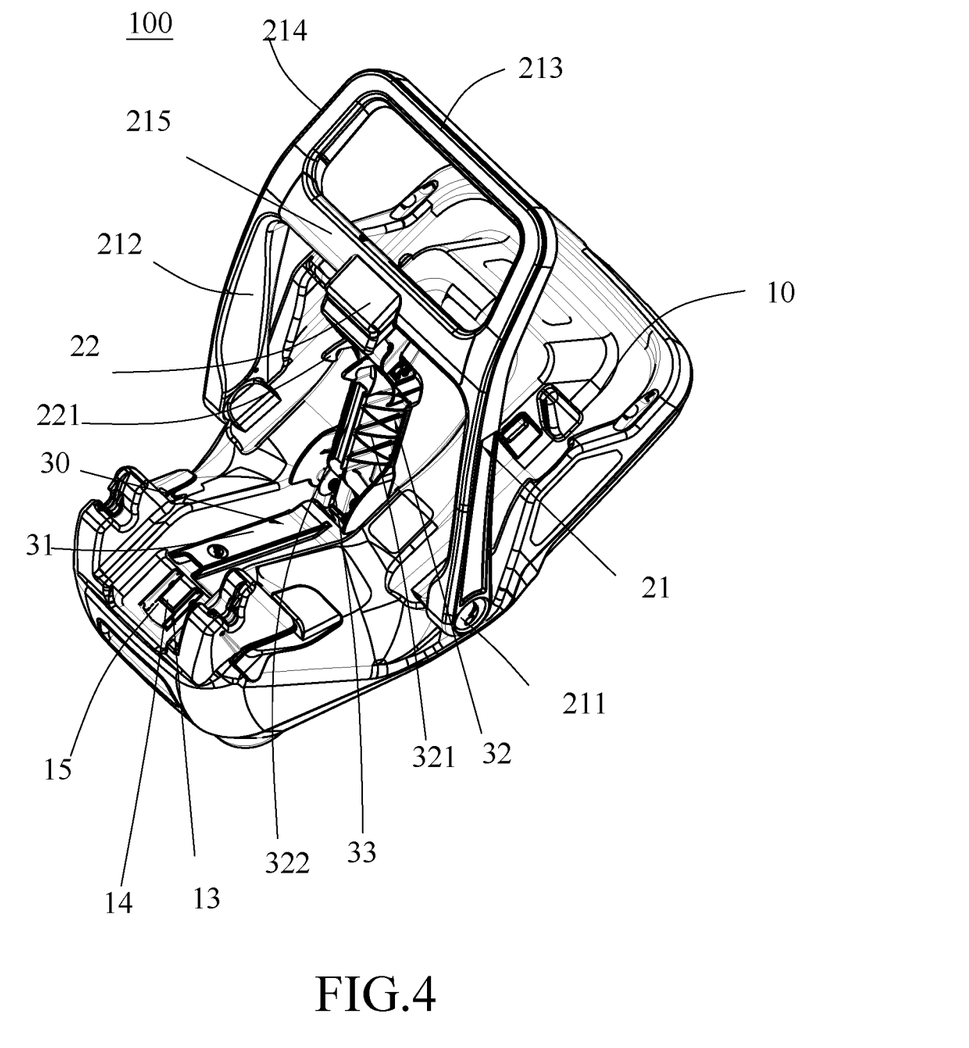
FIG. 4 is a schematic view of the seat, where the seat belt fixing device has exited the locked position.
Figure 5:
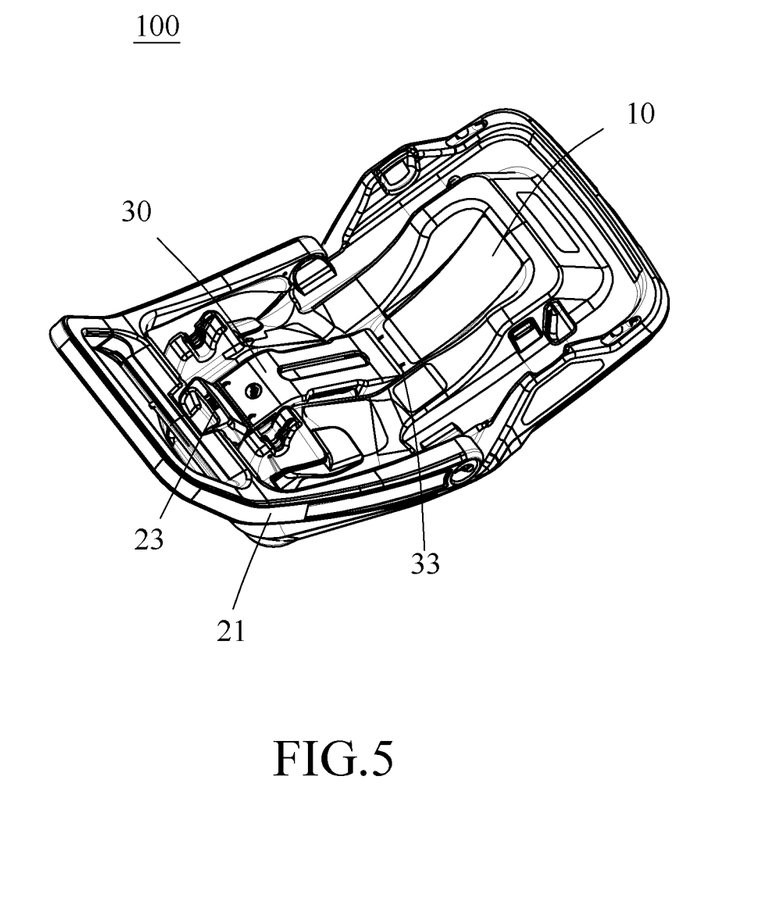
FIG. 5 is a schematic view based on FIG. 3 and taken at another angle.
Figure 6:
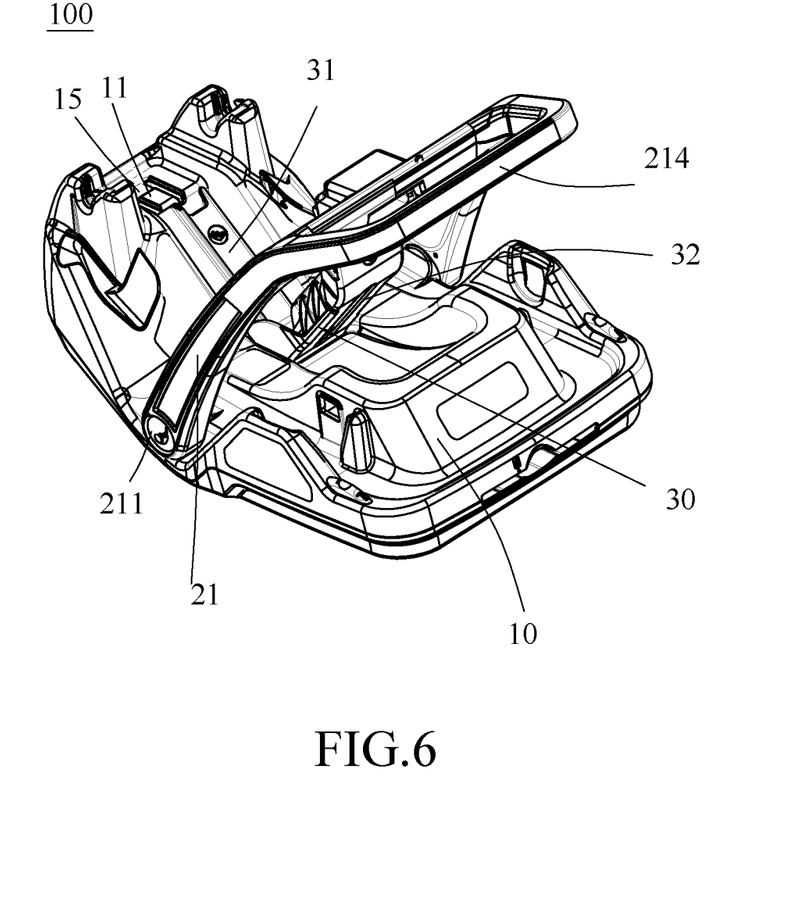
FIG. 6 is a schematic view based on FIG. 4 and taken at another angle.
Figure 7:
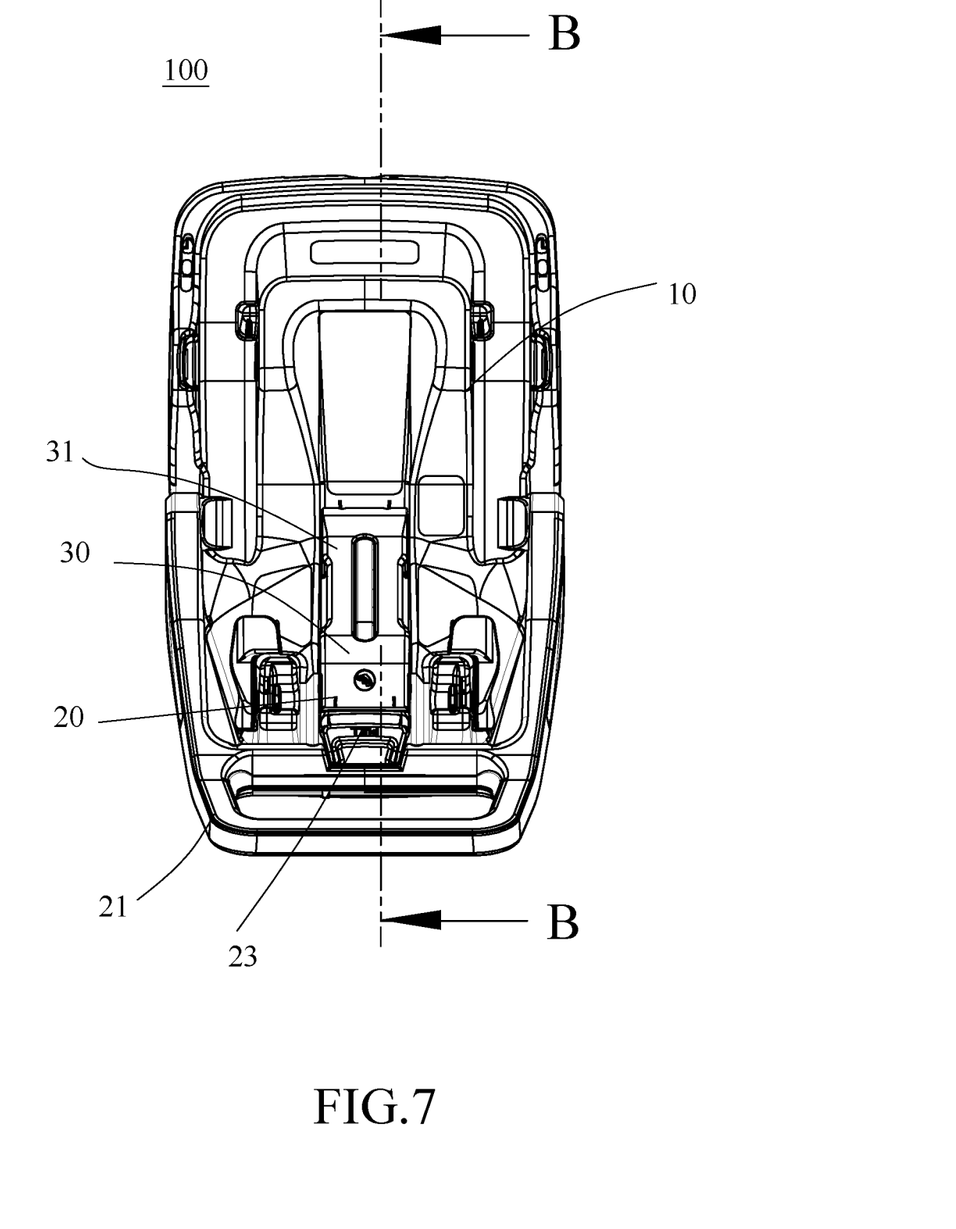
FIG. 7 is a top view based on FIG. 3.

Referring to FIG. 3 and FIG. 4, the top rod body 21 comprises a rotating portion 211 rotatably configured on the base 10, two rotation arms 212 coupled to the rotating portion 211 and flanking the base 10, and a blocking transverse arm 213 coupled to terminal ends of two rotation arms 212. The blocking transverse arm 213 and the terminal ends of two rotation arms 212 form a blocking fixing portion 214. The embodiment is just an exemplary, and the structure of the top rod body 21 is subject to changes as needed. In this embodiment, the rotating portion 211 is rotatably configured on a rotating axle concentric with the rotating shaft 34. Alternatively, the rotating portion 211 is directly rotatably mounted on the rotating shaft 34.

Referring to FIG. 3 and FIG. 4, the top rod body 21 further comprises a mounting rod 215 coupled to the rotation arms 212, and the locking element 22 is configured on the mounting rod 215. Alternatively, the mounting rod 215 is coupled to the blocking transverse arm 213 or coupled to the rotation arms 212 and blocking transverse arm 213. The terminal ends of rotation arms 212 bend by tilting upward. The mounting rod 215 is coupled to the bends of the two rotation arms 212. The mounting rod 215 is substantially parallel to the blocking transverse arm 213. The abovementioned is just an exemplary of the present disclosure.

Referring to FIG. 3 and FIG. 4, the second clamping element 32 is coupled to the middle of the mounting rod 215, and the locking element 22 is configured at the terminal end of second clamping element 32, i.e., located at the middle of the mounting rod 215 as well. Alternatively, the locking element 22 is configured on a lateral edge of the mounting rod 215. In another embodiment, the locking element 22 is directly configured on the rotation arms 212.

Referring to FIG. 8 and FIG. 10, the locking element 22 comprises a fittingly engaging element 221 and a first resilient element 222. The fittingly engaging element 221 is movably configured on the top rod body 21 and snap-engaged with the fixedly engaging element 11. The first resilient element 222 provides to the fittingly engaging element 221 a resilience force for fittingly, engagingly coupling to the fixedly engaging element 11. The operating element 23 is coupled to the fittingly engaging element 221. The operating element 23 is operated to controllably cause the fittingly engaging element 221 to separate from the fixedly engaging element 11. The user may rotate the top rod body 21 until the top rod body 21 reaches the locked position, such that the fittingly engaging element 221 is driven by the first resilient element 222 to approach the fixedly engaging element 11 and fittingly, engagingly couple to the fixedly engaging element 11, so as to lock the top rod body 21 to the locked position.

In this embodiment, the fittingly engaging element 221 is rotatably coupled to the top rod body 21. When driven by the first resilient element 222 and operating element 23, the fittingly engaging element 221 rotates relative to the top rod body 21 and thus fittingly engages with the fixedly engaging element 11 or separates from the fixedly engaging element 11. The fittingly engaging element 221 comprises a fixedly engaging end fittingly, engagingly coupled to the fixedly engaging element 11 and a connection end abuttingly coupled (or coupled by any other means as long as the operating element 22 can drive the rotation of the fixedly engaging element 11) to the operating element 22. The embodiment is just an exemplary, and thus the locking element 22 is not restricted to the aforesaid structure. For example, the locking element 22 is directly, abuttingly, movably configured at the top rod body 21 and driven by the operating element 23 to fittingly engage with the fixedly engaging element 11 or separate from the fixedly engaging element 11. Alternatively, the fittingly engaging element 221 is configured on the second clamping element 32 or seat 100, for example, on the base 10 or first clamping element 31.

Referring to FIG. 9 and FIG. 10, the operating element 23 comprises a press button resiliently mounted on the top rod body 21. Alternatively, the operating element 23 is a push element or pull element rather than restricted to the aforesaid structure. In this embodiment, the operating element 23 and locking element 22 abut against and connect to each other and are driven by the first resilient element 222 to undergo position restoration. In some embodiments, the operating element 23 may also be fixedly coupled to the locking element 22.

Referring to FIG. 4 and FIG. 8, in this embodiment, the fixedly engaging element 11 is a fixedly engaging groove, and the fittingly engaging element 221 is a fittingly engaging hook fittingly, engagingly coupled to the fixedly engaging groove. Alternatively, the fixedly engaging element 11 may be implemented by a hole, bump, fittingly engaging edge, and the locking element 22 may also have a corresponding bump, hole, or fittingly engaging platform.

Referring to FIG. 8, the fixedly engaging groove further has therein a fixing cylinder (fixing rod) 12 rotatably configured in place. When the fittingly engaging element 221 and fixedly engaging element 11 are fittingly, engagingly coupled, the dent of the fittingly engaging hook comes into contact with the corresponding point on the fixing cylinder 12; hence, the fittingly engaging hook can be driven to exit the fixedly engaging groove by the operating element 23. The outer surface of the fixing cylinder 12 matches the inner surface of the fittingly engaging hook to increase the stability of the fittingly engagement therebetween; their arcuate, matching surfaces not only reduce the wear and tear otherwise caused by the abutting engagement between the fixedly engaging groove and fittingly engaging hook but also allow the fittingly engaging hook to separate from the fixedly engaging groove easily. It also allows to reduce the friction of the fittingly engaging hook sliding out of the fixedly engaging groove when the fittingly engaging hook is inadvertently stuck. Alternatively, the fixing cylinder 12 may be a roller rotatably configured in place within the fixedly engaging groove. When the fittingly engaging hook exits the fixedly engaging groove, the fittingly engaging hook comes into contact with the roller and drives the roller to rotate to assist the fittingly engaging hook in separating from the fixedly engaging groove, thereby further reducing the friction of the fittingly engaging hook sliding out of the fixedly engaging groove. In other cases, the fixing cylinder 12 may have an arcuate fixing edge that matches the fittingly engaging element 221 rather than is restricted to the aforesaid embodiment.

Referring to FIG. 4 and FIG. 8, a receiving chamber 13 is disposed at the base 10 of the seat 100 and corresponds in position to the locking element 22. A resilient arm 14 is extended from one side of the receiving chamber 13. A recess 15 for receiving the fittingly engaging hook (fittingly engaging element 221) is formed between an end portion of the resilient arm 14 and another side (opposite to the extending sidewall) of the receiving chamber 13. The fixedly engaging groove (fixedly engaging element 11) is formed below the end portion of the resilient arm 14. In this embodiment, the fixedly engaging element 11 is configured on the seat 100, and the abovementioned constitutes only an exemplary of the present disclosure. In other embodiments, the fixedly engaging element 11 is configured on the second clamping element 32 or top rod body 21. In those embodiments, the fittingly engaging element 221 is configured on the base 10 of the seat 100.

While the present disclosure has been described by means of specific embodiments, numerous modifications and variations could be made thereto by those skilled in the art without departing from the scope and spirit of the present disclosure set forth in the claims.

What is claimed is:

1. A seat belt fixing device, comprising:
 a seat belt clamp configured on a seat, the seat belt clamp comprising:
  a first clamping element formed on the seat; and
  a second clamping element rotatably configured on the seat, wherein the second clamping element being rotated to a locked position to clamp a seat belt while operating in conjunction with the first clamping element;
 a top rod body;
 a locking component; and
 an operating element,
 wherein the locking component comprises:
  a locking element; and
  a fixedly engaging element,
  wherein one of the locking element and the fixedly engaging element is configured on the top rod body or the second clamping element, and another one of the locking element and the fixedly engaging element is configured on the seat,
  wherein the top rod body and the second clamping element are coupled together and rotate concentrically,
  at the locked position, the locking element is fittingly, engagingly coupled to the fixedly engaging element to lock the top rod body and the second clamping element, wherein the operating element is coupled to the locking element, such that the operating element is operated to drive movement of the locking element in order to control fitting engagement between the locking element and the fixedly engaging element.

2. The seat belt fixing device of claim 1, wherein, at the locked position, a terminal end of the top rod body extends to an outer edge of the seat to form a blocking fixing portion protruding from the seat.

3. The seat belt fixing device of claim 2, wherein an acute angle is formed between a straight line joining a terminal end of the blocking fixing portion and a rotation center of the top rod body and a bottom surface of a base of the seat.

4. The seat belt fixing device of claim 2, wherein the terminal end of the top rod body upwardly bends and extends.

5. The seat belt fixing device of claim 2, wherein the top rod body comprises:
 a rotating portion, rotatably configured on the seat;
 two rotation arms, coupled to the rotating portion and disposed on two sides of the seat respectively; and a blocking transverse arm coupled to terminal ends of the two rotation arms,
wherein the terminal ends of the two rotation arms and the blocking transverse arm form the blocking fixing portion.

6. The seat belt fixing device of claim 5, wherein the top rod body further comprises a mounting rod coupled to the rotation arms or blocking transverse arm, and the locking element is configured on the mounting rod.

7. The seat belt fixing device of claim 6, wherein the terminal ends of the rotation arms bend by tilting upward, and two ends of the mounting rod are coupled to the bends of the two rotation arms respectively.

8. The seat belt fixing device of claim 6, wherein the mounting rod is configured in place between the two rotation arms, and in substantially parallel with the blocking transverse arm, wherein the locking element or the fixedly engaging element is configured in place at a middle or a lateral portion of the mounting rod.

9. The seat belt fixing device of claim 6, wherein the mounting rod is configured in place between the two rotation arms and in substantially parallel with the blocking transverse arm, wherein an end of the second clamping element is configured at a middle of the mounting rod.

10. The seat belt fixing device of claim 1, wherein the locking element comprises:
a fittingly engaging element; and
a first resilient element,
wherein the fittingly engaging element is movably configured on the top rod body, second clamping element or seat body and snap-engaged with the fixedly engaging element,
wherein the first resilient element provides to the fittingly engaging element a resilience force for fittingly engaging with the fixedly engaging element, such that the fittingly engaging element is fittingly, engagingly coupled to the fixedly engaging element at the locked position,
wherein the operating element is coupled to the fittingly engaging element, and the operating element is operated to controllably cause the fittingly engaging element to separate from the fixedly engaging element.

11. The seat belt fixing device of claim 10, wherein the fittingly engaging element is rotatably coupled to the top rod body, second clamping element or seat body.

12. The seat belt fixing device of claim 1, wherein the seat belt clamp further comprises a resilient element, and the resilient element provides to the second clamping element a resilience force for rotating away from the locked position.

13. The seat belt fixing device of claim 1, wherein the second clamping element comprises a clamping portion operating in conjunction with the first clamping element and a reinforcing portion coupled to the clamping portion, wherein the reinforcing portion has a front end coupled to a rotating shaft of the second clamping element and a terminal end inserted into the top rod body.

14. The seat belt fixing device of claim 1, wherein the fixedly engaging element is a fixedly engaging groove, and the locking element comprises a fittingly engaging hook for fittingly, engagingly coupling to the fixedly engaging groove.

15. The seat belt fixing device of claim 14, wherein the fixedly engaging groove has therein a roller rotatably configured in place and adapted to operate in conjunction with the fittingly engaging hook or an arcuate fixing edge or fixing cylinder fixedly configured in place and adapted to operate in conjunction with the fittingly engaging hook.

16. The seat belt fixing device of claim 14, wherein a receiving chamber is not only disposed on the second clamping element, the top rod body or the seat which the fixedly engaging element is mounted on but also corresponds in position to the locking element, wherein an edge of the receiving chamber extends outward to form a resilient arm, wherein a recess is formed between an end portion of the resilient arm and another edge of the receiving chamber and adapted to receive the fittingly engaging hook, wherein the fixedly engaging groove is formed below the end portion of the resilient arm.

17. The seat belt fixing device of claim 1, wherein the operating element comprises a press button capable of resilient position restoration.

18. The seat belt fixing device of claim 1, wherein the second clamping element has a front end rotatably installed on the seat and a terminal end coupled to the top rod body.

19. A seat including the seat belt fixing device of claim 1, and further comprising:
a seat body; and
a base,
wherein the seat belt fixing device is configured on the base.

* * * * *